W. H. SCHLOTT & A. G. HOEFLINGER.
VEHICLE TOP.
APPLICATION FILED SEPT. 9, 1915.

1,233,405.

Patented July 17, 1917.
2 SHEETS—SHEET 1.

WITNESSES

INVENTOR
William H. Schlott
Adolph G. Hoeflinger

BY
ATTORNEY

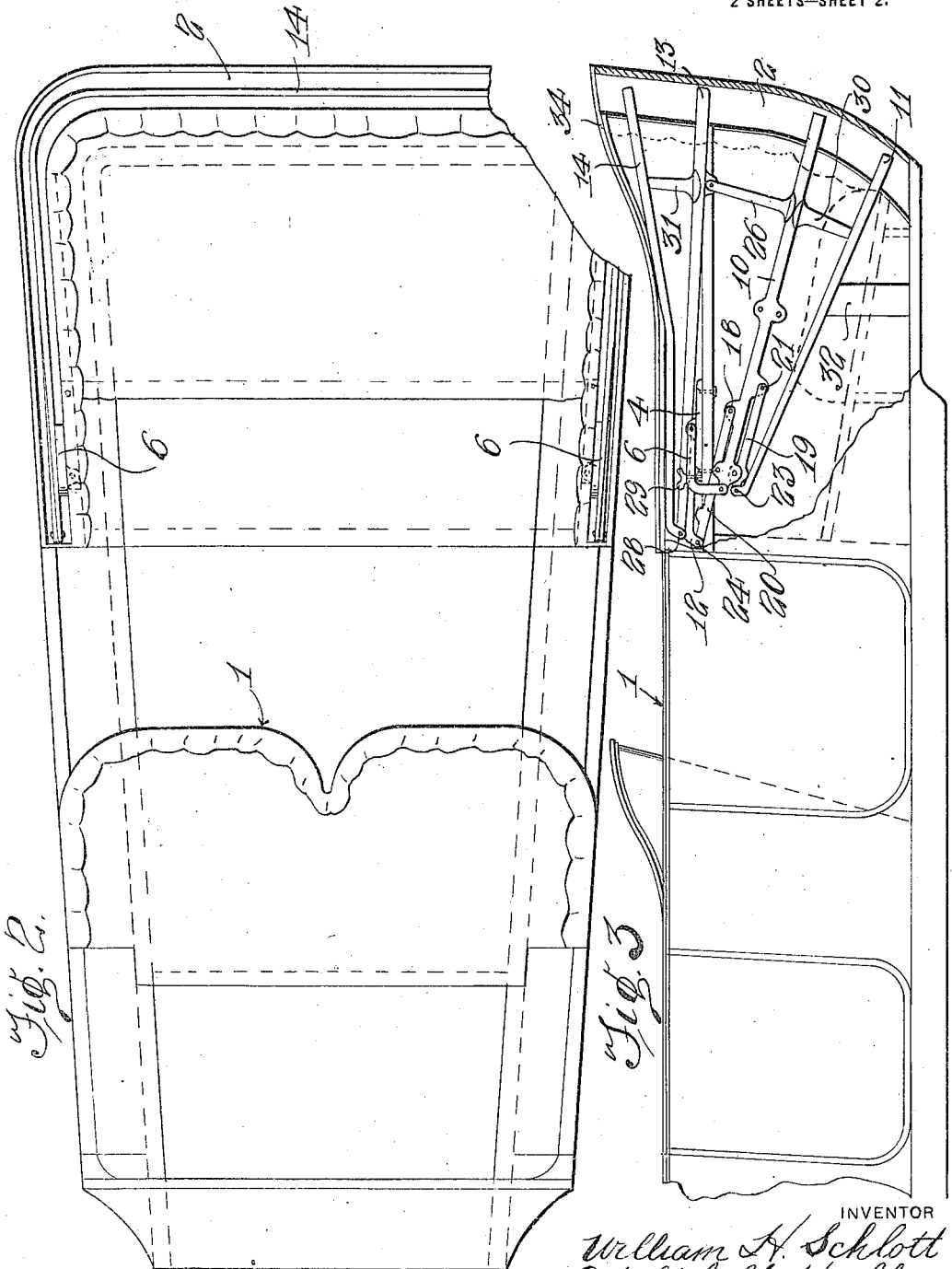

UNITED STATES PATENT OFFICE.

WILLIAM H. SCHLOTT AND ADOLPH G. HOEFLINGER, OF MISHAWAKA, INDIANA.

VEHICLE-TOP.

1,233,405.

Specification of Letters Patent.

Patented July 17, 1917.

Application filed September 9, 1915. Serial No. 49,805.

*To all whom it may concern:*

Be it known that we, WILLIAM H. SCHLOTT and ADOLPH G. HOEFLINGER, citizens of the United States, residing at Mishawaka, in the county of St. Joseph and State of Indiana, have invented certain new and useful Improvements in a Vehicle-Top, of which the following is a specification.

Our invention consists in the novel construction of vehicle tops or hoods which are more especially intended for automobiles, the mentioned top being light, compact, easily movable, and when folded, so arranged relatively to the automobile body as to be completely concealed, protected and inclosed.

An object of the invention is to provide an improved collapsible automobile top wherein the supporting bows, runners, and various other parts may be shifted and folded in a novel and peculiar manner and to occupy a minimum of space; the various component parts, when thus folded or collapsed, resting one upon the other in widely spaced relation that the canopy or top proper may be to a certain extent distended or spread.

A further object of the invention is to provide an arrangement whereby the existing symmetry of an automobile body will in no way be affected or impaired by the top or hood when collapsed.

We further contemplate an improved pivoted bracket support for the automobile top.

The above and additional objects are accomplished by such means as are illustrated in their preferred embodiment in the accompanying drawings, described in the following specification and then more particularly pointed out in the claim which is appended hereto and forms a part of this application.

In describing our invention in detail reference will be had to the accompanying drawings wherein like characters denote like or corresponding parts throughout the several views, and in which:—

Fig. 2 is a plan view of the automobile body, the hood or top carried thereby having been folded or collapsed; and Fig. 3 is a view similar to Fig. 1, partly broken away, the mentioned hood or top being shown concealed or rather collapsed.

Figure 1:
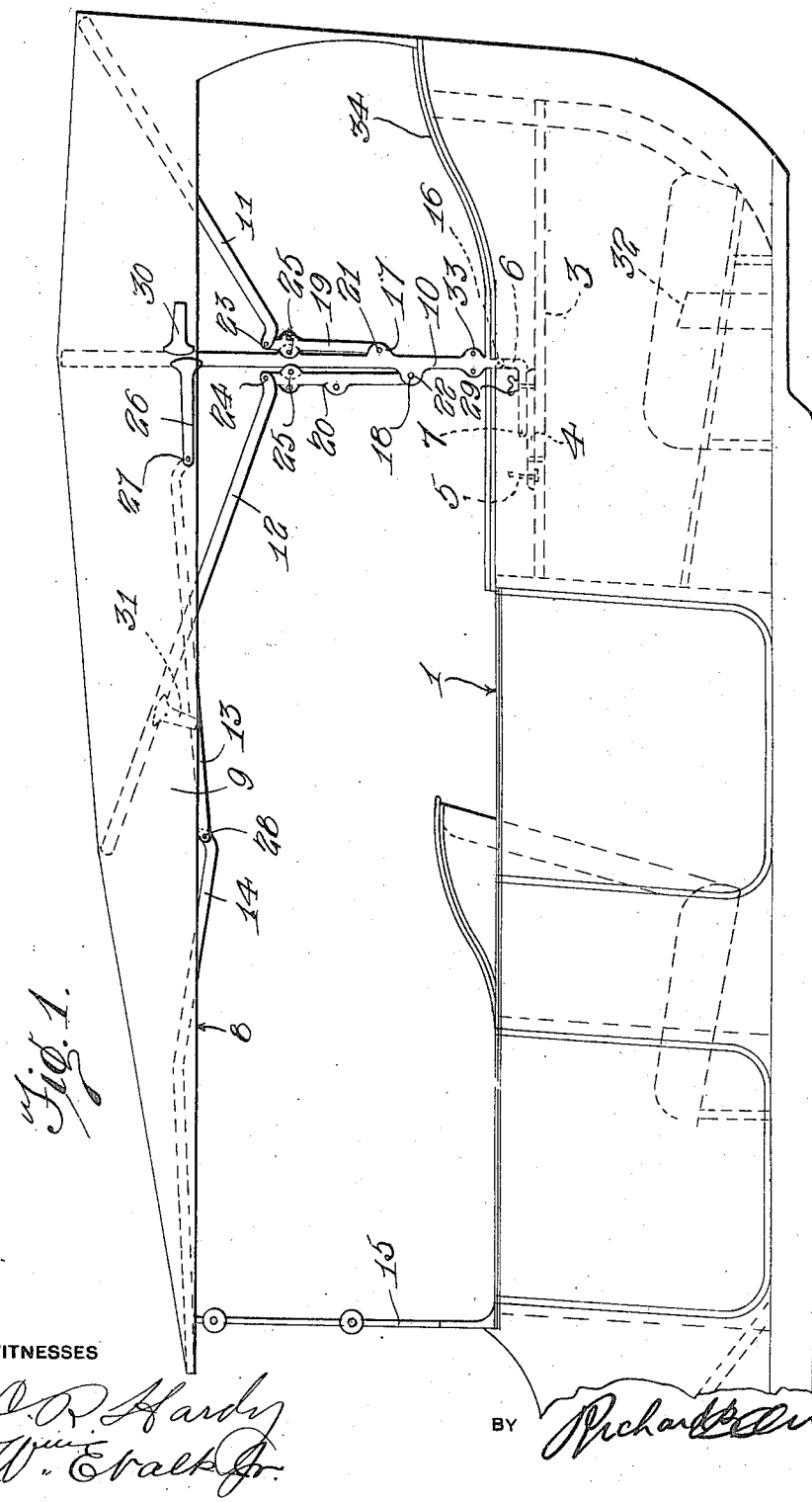
Figure 1 is a side elevation of an automobile body equipped with our improved hood or top.

Referring now to the drawings by numerals, 1 designates as an entirety an automobile body of ordinary construction except that at the rear end thereof a pocket 2 is formed to receive and inclose the hood or top when collapsed. The mentioned pocket 2 is of a size to extend from a point at each side of the car body 1 in line with the rear end of the rear doors of said body, to a point at the rear of the rear seat where it extends across the rear end of the car body as shown to advantage in Fig. 2.

A belt or support 3 is fastened to the car body within the pocket 2 and at each side thereof and at a point adjacent the pocket top to act as a means whereby a supporting plate 4 equipped with fastening screws 5 may be maintained in such relation to the said car body 1 as to support opposed substantially L-shaped brackets 6, each of which is pivotally connected as indicated at 7 to the respective supporting plates 4.

Brackets 6, support in a raised position the hood or top designated as an entirety by the numeral 8. The said top 8 in its preferred embodiment may be said to consist of a canopy or top proper 9, a main supporting bow 10, auxiliary supporting bows 11 and 12, runners 13 and 14 and a support means 15 composed of the wind shield with fasteners at the top disposed forwardly of the car body to engage with the forward end of the canopy 9. The main supporting bow 10 is pivoted as at 16 to the opposed supporting brackets 6. Ears 17 and 18 are formed upon the supporting bow 10 that links 19 and 20 may be pivoted respectively as at 21 and 22 therebetween. Link 19 is pivoted as at 23 to the auxiliary supporting bow 11 and link 20 as at 24 to the auxiliary supporting bow 12, the former, bow 11, extending rearwardly at an angle to the bow 10 and the latter, bow 12, extending forwardly at an angle thereto. Each of the several bows 10, 11 and 12 support (as implied) the canopy or top proper 9 in the manner desired. Any suitable detachable fastening means such as the removable pins 25 may be provided for the links 19 and 20 that the said links may be maintained, when the top is raised, in parallelism with the supporting bow 10. Arms 26 are fastened to the supporting bow 10, one at each side thereof, each arm acting as a support for the runners 13. The runners 13 in turn support the runners 14, the latter, runners 14, being foremost, engage with and support the forward end of the top proper 9. The runners 13 are pivoted as at 27 to the arms 26 and the runners 14 as at 28 to the runners 13, such connection permitting the hood or top to be folded or collapsed as hereinafter described.

Each of two fastening screws 5 carried by the supporting plates 4 is provided with a thumb nut 29. The fastening screw 5 at the rear end of each plate 4 is adapted for engagement with its associate supporting bracket 6 when the hood or top 9 is in a raised position and the fastening screw at the forward end of each plate 4 is adapted for engagement with its associate supporting bracket 6 when the said hood is in a collapsed or folded position. The thumb nuts 29 act as a lock means whereby the supporting brackets are held against movement subsequent to adjustment as stated.

Abutments designated respectively 30 and 31 are carried by the respective bows 10 and 12 that the mentioned bows may be maintained in spaced relation when collapsed. The exact function of the abutments 30 and 31 will be pointed out more specifically hereinafter. A ledge or support 32 is secured to the car body 1 at each side thereof and within the pocket 2 that the hood 9 may be supported in the desired manner when collapsed.

Movement of the various hood parts during a folding operation is substantially as follows: The connection between the support 15 and the hood is removed, the pins 25 withdrawn and the thumb nut 29 removed. Link 19, with its associate auxiliary supporting bow 11 is then swung about its pivot 21 to engage with ears 33 formed on the supporting bow 10 equi-distant from the pivot point 21 that it may be fastened in a manner similar to the fastening means designated 25. Bow 11, when the links 19 have been thus moved will extend substantially in parallelism with the supporting bow 10. Links 20 are next swung forwardly that the auxiliary supporting bow 12 may be moved into proximity with the supporting bow 10 and the runners 13 and 8 therewith. The runners 13 extend substantially in parallelism with the sides of the bow 12, while the runners 14 are held at an angle to the sides of the said bow 12 by means of the abutments 31 which engage therewith. The abutments 30 engage the sides of the bow 11 that the latter may be spaced from the supporting bow 10. When folded, the entire top is bodily moved forwardly about the pivot 7 and at the same time downwardly and rearwardly about the pivot 16 so as to fit, when finally collapsed, the pocket 2 at the rear of the body 1. When collapsed, the supporting bracket 6 may be fastened in place. The bow 11, when completely collapsed, will contact with the ledge or support 32. The several bows and runners will be maintained in spaced relation to preclude mashing of the material of which the top proper is composed, and the various links and abutments will so fold or move as to support the canopy in a folded position and in the manner desired.

If desired, a strip of material designated 34 may be fastened to the rear seat of the vehicle to act as a cover for the pocket 2 when the hood or top is distended and collapsed.

From the foregoing, taken in connection with the accompanying drawings it is apparent that the hood or top is protected, concealed and inclosed when collapsed; that the folding operation is of such a nature as to be subjected to "oneman's"control; and that the material of which the top proper is composed will be somewhat distended or spread, even when collapsed, to preclude mashing, crinkling, cracking and consequently rapid unfitness for use.

In reduction to practice, we have found that the form of our invention, illustrated in the drawings and referred to in the above description, as the preferred embodiment, is the most efficient and practical; yet realizing that the conditions concurrent with the adoption of our device will necessarily vary, we desire to emphasize the fact that various minor changes in details of construction, proportion and arrangement of parts may be resorted to, when required, without sacrificing any of the advantages of our invention, as defined in the appended claim.

Having thus fully described our invention, what we claim as new and desire to secure by Letters Patent, is:—

In combination with a vehicle having a pocket formed therein, of a collapsible top for said vehicle comprising supporting brackets mounted within said pockets upon horizontal pivots, means forming a support for said brackets extending horizontally upon opposite sides of the pivot point of said brackets, said supporting means allowing said brackets to swing in the arc of a half circle, a main supporting bow pivoted to the respective brackets, links pivoted to said supporting bow, auxiliary supporting bows pivoted to said links, the mentioned auxiliary bows extending at an angle to said main supporting bow, means to releasably lock said links in a position in parallelism with said main supporting bows, runners pivoted to each other to extend forwardly of said supporting bow, the respective runners and bows being adapted for folding engagement, and the entire top when collapsed being adapted for fitting engagement within the pocket aforesaid.

In testimony whereof we affix our signatures in presence of two witnesses.

WILLIAM H. SCHLOTT.
ADOLPH G. HOEFLINGER.

Witnesses:
HARRY G. GRAHAM,
JOSEPH E. WEBSTER.

Copies of this patent may be obtained for five cents each, by addressing the "Commissioner of Patents, Washington, D. C."